United States Patent [19]
Holzmann et al.

[11] Patent Number: 5,205,623
[45] Date of Patent: Apr. 27, 1993

[54] HYDRAULIC BRAKE SYSTEM

[75] Inventors: Roland Holzmann, Stuttgart; Karl-Heinz Willmann, Freiberg, both of Fed. Rep. of Germany

[73] Assignee: Robert Bosch GmbH, Stuttgart, Fed. Rep. of Germany

[21] Appl. No.: 786,672

[22] Filed: Nov. 1, 1991

[30] Foreign Application Priority Data

Nov. 8, 1990 [DE] Fed. Rep. of Germany ....... 4035527

[51] Int. Cl.⁵ .................. B60T 8/32; B60K 28/16
[52] U.S. Cl. .................. 303/113.2; 303/116.1; 303/119.1
[58] Field of Search ............ 303/113 TR, 110, 116 R, 303/119 R, 93, 113 TB, 114 R, 116 SP, 116 WP, 116 PC, 119 SV; 188/181 A, 181 R

[56] References Cited
U.S. PATENT DOCUMENTS

| 4,861,118 | 8/1989 | Burckhardt et al. | 303/113 TR |
| 4,900,102 | 2/1990 | Johner et al. | |
| 5,015,043 | 5/1991 | Rasch | 303/113 TR |

Primary Examiner—Douglas C. Butler
Attorney, Agent, or Firm—Edwin E. Greigg; Ronald E. Greigg

[57] ABSTRACT

A hydraulic brake system having an anti-lock system (ABS) and traction control (ASR) for motor vehicles including a hydraulic unit with at least one control valve and a return pump having at least one pump element that is embodied as self-aspirating pump element and that is operative in a brake circuit, which contains at least one drive wheel. A valve assembly serves to furnish brake pressure in ASR and each valve assembly comprises a respective charging valve embodied as a 2/2-way magnet valve and an electromagnetic reversing valve. In order that a low hydraulic power requirement can be attained in traction control, only the valve assembly is triggered, and is triggered such that for pressure buildup the electromagnetic reversing valve blocks fluid flow and the charging valve is opened, while for pressure holding both valves block fluid flow, and for pressure reduction the charging valve blocks fluid flow and the electromagnetic reversing valve is opened.

28 Claims, 2 Drawing Sheets

HYDRAULIC BRAKE SYSTEM

BACKGROUND OF THE INVENTION

The invention is based on a hydraulic brake system having an anti-skid or anti-lock system (ABS) and traction control (ASR) for motor vehicles.

In a known brake system of this type, which is embodied as a dual-circuit brake system with front/rear axle or front/rear brake circuit distribution (DE 38 16 073 A1; U.S. Pat. No. 4,900,102), the charging valve is embodied as a hydraulically controlled 2/2-way valve and the reversing valve is embodied as a 3/2-way magnet valve. The 2/2-way valve is connected by its control inlet to a brake circuit outlet of the master brake cylinder, and in its uncontrolled basic position it is open. The 3/2-way magnet valve is open in its unexcited basic position and thus allows the brake fluid to flow through the connecting line, and in its working position brought about by magnet excitation, it connects the outlet of the pump element to the brake fluid tank via a pressure limiting valve, by disconnecting the master brake cylinder from the brake circuit. The pressure limiting valve limits the system pressure in the brake circuit during traction control (ASR) to approximately 70 bar. The control valves are embodied as 3/3-way magnet valves, in such a way that in their first, unexcited basic position, a pressure buildup in the wheel brake cylinders can take place; in their second, middle valve position, which is brought about by excitation of the control valves with half the maximum current, the wheel brake cylinders are blocked off so that the pressure in them is maintained; and in their third, terminal valve position, which is brought about by valve excitation with maximum current, the wheel brake cylinders are connected for pressure reduction to the inlet of the associated pump element of the return pump.

The reversing valve embodied as a 3/2-way magnet valve is always switched over whenever at least one of the driven wheels is exhibiting slip. The return pump is switched on at the same time. The return pump element that is operative in the brake circuit of the driven wheels and is embodied as self-aspirating aspirates brake fluid from the brake fluid tank via the opened charging valve and generates a brake supply pressure that is fed via the control valves into the wheel brake cylinders of the driven wheel or wheels that is slipping. The control valve of the nonslipping driven wheel is shifted into its middle position, so that the associated wheel brake cylinder is blocked off, and no brake pressure can be built up. For pressure holding and pressure reduction, the control valve associated with the slipping driven wheel is shifted to its middle or terminal position. Excess brake fluid is returned to the brake fluid tank via the reversing valve and the pressure limiting valve.

OBJECT AND SUMMARY OF THE INVENTION

The brake system according to the invention has an advantage that as a result of the triggering according to the invention of the valve assembly having the charging valve embodied as a 2/2-way magnet valve in traction control, the outset pressure of the self-aspirating pump element always matches the brake pressure built up in the wheel brake cylinder of the slipping driven wheel. The hydraulic power requirement is low as a result, so that little heating of the return pump and less hydraulic noise are involved. The pressure limiting valve is unnecessary and can be dispensed with. Thus all the disadvantages associated with the pressure limiting valve as a critical component, such as dispersion of air into the brake fluid, are eliminated.

Other advantageous features of and improvements to the brake system disclosed are possible.

In a preferred embodiment of the invention, a check valve having a blocking direction toward the master brake cylinder is connected parallel to the reversing valve. Together with the triggering of the valve assembly during the traction control according to the invention, this check valve makes braking via the master brake cylinder possible, so that a uniform pressure buildup in the drive wheels is assured. The pressure buildup in the wheel brake cylinders of the drive wheels takes place as soon as the pressure in the master brake cylinder exceeds the instantaneous pressure in the wheel brake cylinders of the drive wheels. Underbraking of the drive wheels is thus prevented, and good pedal comfort at the typically low brake fluid volume in the wheel brake cylinders is assured.

In another embodiment of the invention, a pressure limiting valve is disposed in a bypass around the reversing valve, to protect the self-aspirating pump element of the return pump. The starting pressure of this pressure limiting valve is set to be higher than the maximum outlet pressure of the pump element, which is approximately 20 bar. In traction control, in principle, accordingly no brake fluid is pumped via the pressure limiting valve, so that the disadvantages of that valve, such as dispersion of air into the brake fluid, do not become apparent.

In another embodiment of the invention, the reversing valve is advantageously embodied as a 2/2-way magnet valve. Such a simple valve is sturdy and quite inexpensive.

The brake system according to the invention can be embodied as a single-circuit brake system for motorcycles or as a dual-circuit brake system for motor vehicles. In the dual-circuit brake system, a diagonal brake circuit distribution is preferably made, although a front/rear axle brake circuit distribution is also possible. In the latter case, during traction control, the control valve associated with the wheel brake cylinder of the non-slipping drive wheel must be switched over to its blocking position, to prevent a brake pressure buildup in that wheel brake cylinder.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
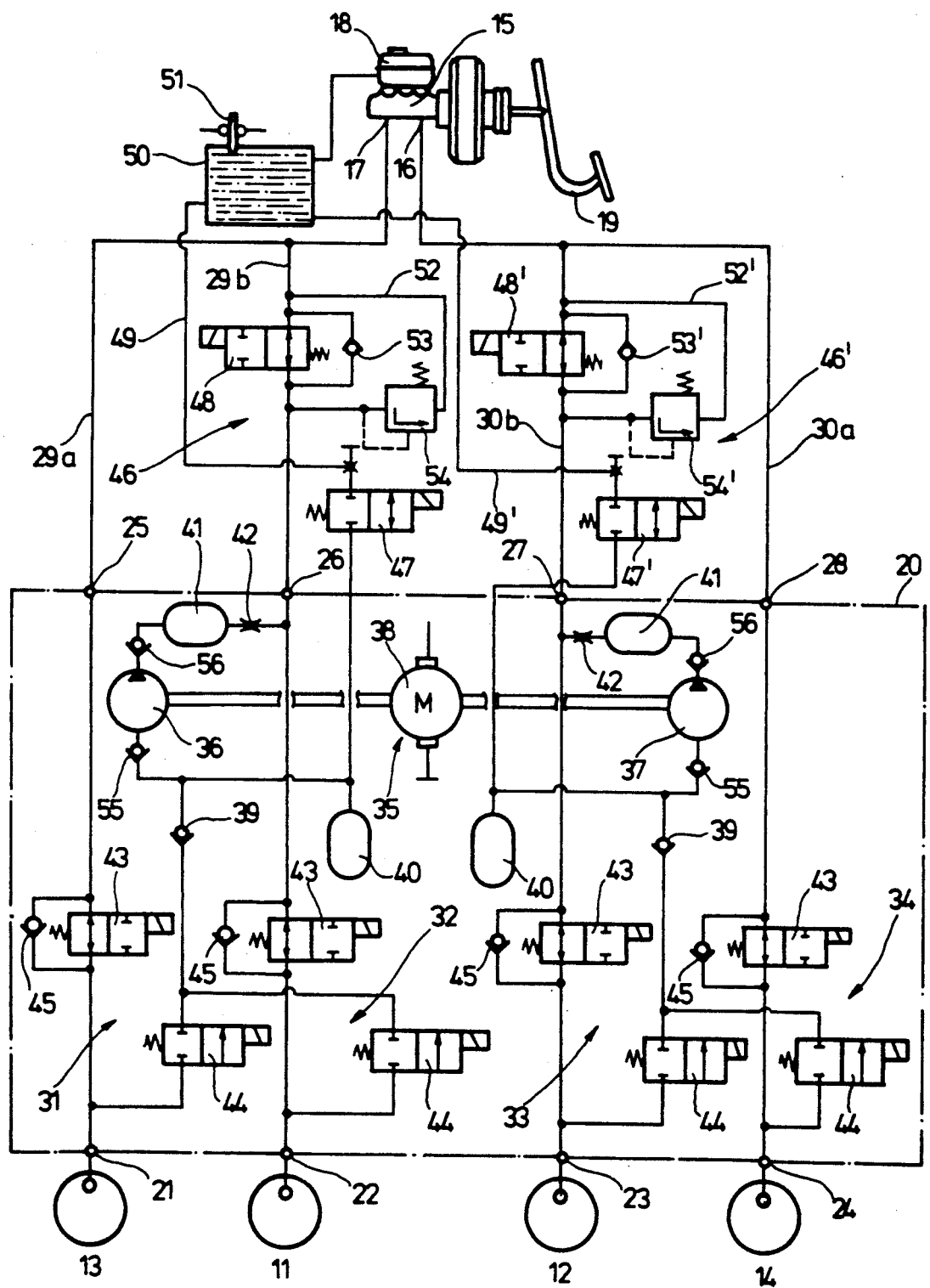
FIG. 1 is a block circuit diagram of a dual-circuit brake system with diagonal brake circuit distribution and with an anti-lock system and traction control for a passenger car.

In the dual-circuit brake system shown in a block circuit diagram in FIG. 1, having diagonal brake circuit distribution, an anti-lock system (ABS) and traction control (ASR), also called propulsion control for a passenger car, the wheel brake cylinders 10 of the drive wheels 11, 12 and the wheel brake cylinders 10 of the nondriven wheels 13, 14 are distributed over both brake circuits, so that one wheel brake cylinder 10 of one driven wheel 11 or 12 and one wheel brake cylinder 10 of one non-driven wheel 13 or 14 is associated with one brake circuit. In general, the drive wheels 11, 12 are the front wheels of the passenger car. In a manner known per se, a master brake cylinder 15, which has two separate brake circuit outlets 16, 17 each for connection with one of the two brake circuits and communicates with a brake fluid tank 18, is a part of the dual-circuit brake system in a manner known per se. Upon actuation of a brake pedal 19, a brake pressure of equal magnitude is fed to both brake circuit outlets 16, 17.

The dual-circuit brake system also includes a four-channel hydraulic unit 20, which has four outlet channels 21–24 and four inlet channels 25–28. The two inlet channels 25, 26 belonging to one brake circuit are each connected via a respective connecting line 29a and 29b with the brake circuit outlet 17 of the master brake cylinder 15, and the two inlet channels 27, 28 belonging to the other brake circuit communicates via connecting lines 30a and 30b with the brake circuit outlet 16 of the master brake cylinder 15. One wheel brake cylinder 10 of the wheels 11–14 is connected to each outlet channel 21–24 of the four-channel hydraulic unit 20. One control valve 31–34 is assigned to each outlet channel 21–24. The control valves 31–34 are controlled by an electronic control system, not shown here, and build up a wheel-slip-dependent brake pressure in the associated wheel brake cylinders 10. A return pump 35, which is a component of the four-channel hydraulic unit 20, has two pump elements 36, 37, embodied as self-aspirating, which are driven jointly by an electric motor 38 and serve to return brake fluid to the brakes upon pressure reduction. One pump element each 36 or 37 is operative in one brake circuit, and communicates on the inlet side with the respective control valves 31, 32 and 33, 34 belonging to that brake circuit; a one-way check valve 39 having an open direction toward the pump element 36 or 37 is disposed in this connection. Additionally, the pump elements 36, 37 are connected on the inlet side each to one low-pressure reservoir 40. The low-pressure reservoir 40 serves to temporarily hold brake fluid flowing out of the wheel brake cylinders 10. On the outlet side, the two pump elements 36, 37 communicate with the inlet channel 26 or inlet channel 27, respectively, of the hydraulic unit 20, or in other words with the inlet channels 26, 27 that correspond via the control valves 32, 33 with the outlet channels 22, 23 to which the wheel brake cylinders 10 of the drive wheels 11, 12 are connected. One damper chamber 41 and one throttle restriction 42 are incorporated into each connection between a respective pump element 36, 37 and inlet channel 26, 27. Each pump element 36, 37 has one one-way pump inlet valve 55 and one one-way pump outlet valve 56.

Each control valve 31–34 is formed by a valve unit comprising one inlet valve 43 and one outlet valve 44. Thus in their unexcited basic position, the inlet valves 43 enable unhindered passage from the inlet channels 25–28 to the variously associated outlet channels 21–24 and thus to the wheel brake cylinders 10 of the wheels 11–14. In the working position that can be brought about by magnet excitation, the inlet valves 43 block this passage. The outlet valves 44, in their working position that can be brought about by magnet excitation, connect the outlet channels 21–24 and thus the wheel brake cylinders 10 and the wheels 11–14 to the inlet of the associated pump element 36 or 37, and in their unexcited basic position they block this connection. The aforementioned one-way check valves 39 are contained in the connection between the outlet valves 44 and the pump elements 36, 37. One one-way check valve 45 having a flow direction toward the inlet channels 25–28 is connected parallel to each of the inlet valves 43.

A valve assembly 46 and 46' each assigned to one brake circuit serve to furnish a brake supply pressure in traction control (ASR mode). The two valve assemblies 46, 46' are identical in design; identical components are therefore provided with identical reference numerals, and a prime is added to distinguish between them. The respective valve assemblies 46 and 46' have one charging valve 47 and 47' and one reversing valve 48 and 48'. All the valves are embodied as 2/2-way magnet valves with spring restoration; the reversing valves 48, 48' are open in their unexcited basic position, and the charging valves 47, 47' block in their unexcited basic position. Each charging valve 47, 47' is disposed in a respective suction line 49 or 49', which leads from a brake fluid vessel 50 having a level switch 51 to the inlet of the pump element 36 or 37. The brake fluid vessel s connected to the brake fluid tank 18. The brake fluid vessel 50 serves merely as additional protection to avoid the aspiration of air by the pump elements 36, 37 in case of a malfunction, if the connecting hose to the brake fluid tank 18, which for maintenance or repair work on the hydraulic unit 20 has to be removed from the brake fluid vessel 50, is not properly reconnected afterward. The level switch 51 switches the return pump 35 off as soon as the surface of the fluid in the brake fluid vessel 50 has reached a lower level, below which the danger of air aspiration exists. If this kind of additional protection is omitted, then the two suction lines 49, 49' can be connected directly to the brake fluid tank 18, with the brake fluid vessel 50 omitted.

The reversing valve 48 is incorporated in the connecting line 29b between the brake circuit outlet 17 and the inlet channel 26 of the hydraulic unit 20, and the reversing valve 48' is incorporated in the connecting line 30b between the brake circuit outlet 16 of the master brake cylinder 15 and the inlet channel 27 of the hydraulic unit 20. A respective one-way check valve 53 and 53' with a flow direction toward the inlet channels 26 and 27 is connected parallel to the reversing valve 48 and 48'. In addition, a pressure limiting valve 54 and 54' can be disposed in a bypass 52 and 52' around the reversing valve 48 and 48' and thus parallel to the one-way check valve 53 and 53'. The response threshold of this pressure limiting valve 54 and 54' is somewhat above the maximum starting pressure of the pump element 36 or 37 in traction control so that in normal operation no brake fluid flows out via the pressure limiting valve 54 and 54'. Thus the pressure limiting valve 54, 54' has solely a protection function for pump element 36 and 37 in the case of a malfunction, if the reversing valve 48 and 48' is in the blocking position.

Just like the control valves 31–34 and the switching on of the return pump 35, the two valve assemblies 46, 46' are controlled by the electronic control system, not shown. In traction control, which ensues if at least one drive wheel 11, 12 exhibits wheel slip, the valve assembly 46 or the valve assembly 46' (or both valve assemblies 46, 46' if slip arises at both drive wheels 11, 12) is triggered, whereupon both the charging valve 47 or 48' and the reversing valve 48 or 48' are triggered to build up pressure in the wheel brake cylinder 10 of the slipping drive wheel 11 and/or 12. The brake circuit of the slipping drive wheel 11 or 12 is thereby disconnected on the one hand from the master brake cylinder 15 and on the other is connected to the brake fluid vessel 50. The self-aspirating pump element 36 or 37 pumps brake fluid out of the brake fluid vessel 50 into the wheel brake cylinder 10 of the drive wheel 11 or 12. The starting pressure of the pump element 36 or 37 then always matches the brake pressure built up in the wheel brake cylinder 10 of the drive wheel 11 or 12. Once the necessary brake pressure in the wheel brake cylinders 10 is attained, the triggering of the charging valve 47 or 47' disappears, so that it drops back into its blocking position and the pressure is held. The reversing valve 48 or 48' remains triggered and likewise assumes its blocking position. For pressure reduction in the wheel brake cylinders 10, the triggering of the reversing valve 48 or 48' is cancelled as well, so it returns to its open position. Brake fluid can thus flow back into the master brake cylinder 15 via the inlet valve 43, located in its basic position, of the control valve 32 or 33 and via the opened reversing valve 48 or 48'. During the entire traction control operation the control valves 31-34 continue not to be controlled, so that the inlet and outlet valves 43, 44 are always in their basic position shown in FIG. 1.

Figure 2:
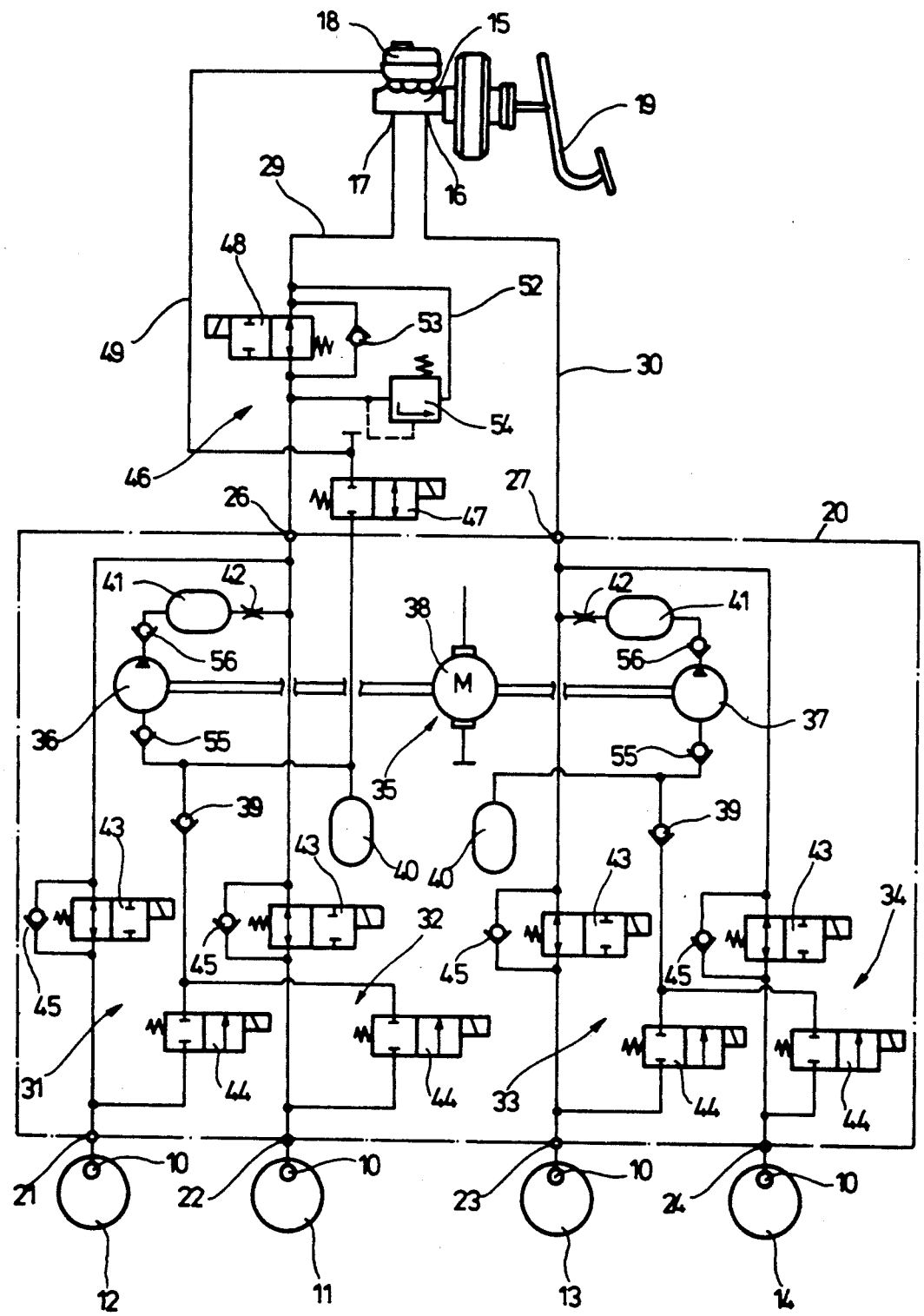
FIG. 2 is a block circuit diagram of a dual-circuit brake system with front/rear brake circuit distribution and with an anti-lock system and traction control.

In the hydraulic dual-circuit brake system with front-/rear brake circuit distribution shown in a circuit diagram in FIG. 2, the drive wheels 11, 12 are located in one brake circuit, which is connected to the brake circuit outlet 17 of the master brake cylinder 15, and the nondriven wheels 13, 14 are located in the other brake circuit, connected to the brake circuit outlet 16 of the master brake cylinder 15. The drive wheels 11, 12 here are usually the rear wheels of the vehicle. To the extent that the dual-circuit brake system matches the dual-circuit brake system with diagonal brake circuit distribution described in conjunction with FIG. 1, the same components are provided with the same reference numerals. In a distinction from FIG. 1, the second valve assembly 46' is omitted here, because the brake supply in the ASR mode is necessary for only the brake circuit of the drive wheels 11, 12. Likewise the brake fluid vessel 50 with the level switch 51 is omitted, and the suction line 49 is connected directly to the brake fluid tank 18. The four-channel hydraulic unit 20 now only has the two inlet channels 26 and 27, which via the two connecting lines 29 and 30 are each connected to one of the two brake circuit outlets 17, 16 of the master brake cylinder 15. Inside the hydraulic unit 20, the control valves 31 and 34 associated with the outlet channels 21 and 24 each communicate with the inlet channels 26 and 27. In traction control, in addition to the above-described mode of operation, the inlet valve 43 of the control valve 31 or 32 that is assigned to the wheel brake cylinder 10 of the nonslipping drive wheel 11, 12 is switched over to its blocking position, so that a pressure buildup in this wheel brake cylinder 10 is prevented.

The invention is not limited to the exemplary embodiments shown. For instance, the control valves 31-34 may also be embodied by 3/3-way magnet valves, which in their basic position enable an unhindered flow between the inlet channels 25-28 and the outlet channels 21-24, in their middle position that can be brought about by magnet excitation at half the maximum current they block off the outlet channels 21-24, and in their terminal position that can be brought about by magnet excitation at maximum current, they connect the outlet channels 21, 22 and 23, 24 to the inlet of the respective pump element 36 and 37 of the return pump 35, via the check valve 39.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A hydraulic brake system with an anti-lock system (ABS) and traction control (ASR) for a motor vehicle, including at least one brake circuit (I, II) having a master brake cylinder with at least one brake circuit outlet for controlling a brake pressure by brake pedal actuation, having a brake fluid tank that communicates with the master brake cylinder of at least one drive wheel, a hydraulic unit connected to the at least one brake circuit outlet, said hydraulic unit has at least one outlet channel for connection of a wheel brake cylinder associated with said at least one drive wheel of the motor vehicle, at least one control valve connected on a first side to the at least one brake circuit outlet via a first connecting line and on a second side to the at least one outlet channel, and a return pump having at least one pump element embodied as self-aspirating, said at least one pump element is connected on an inlet side to the at least one outlet channel via the at least one control valve and on an outlet side said at least one pump element is connected to the first connecting line, at least one valve assembly for furnishing a brake supply pressure in traction control, said at least one valve assembly has a charging valve, which at least in traction control connects the pump element to said brake fluid tank via a second line connection and blocks said second line connection to the brake fluid tank upon brake pedal actuation, and an electromagnetic reversing valve disposed in the first connecting line, said electromagnetic reversing valve blocks the first connecting line in traction control, said charging valve (47, 47') is embodied as a 2/2-way magnet valve, and that upon traction control, said at least one valve assembly (46, 46') and said charging valve are triggered in such a manner that for pressure buildup in the wheel brake cylinder (10) of the at least one drive wheel (11, 12), the electromagnetic reversing valve (48, 48') assumes a blocking position and the charging valve (47, 47') assumes an open position, for pressure holding, each the charging valve (47, 47'), and the electromagnetic reversing valve (48, 48') assume a blocking position, and for brake pressure reduction, the charging valve (47, 47') assumes a blocking position and the electromagnetic reversing valve (48, 48') assumes an open position.

2. A brake system as defined by claim 1, in which a check valve (53, 53') having a blocking direction toward the master brake cylinder (15) is connected parallel to the electromagnetic reversing valve (48, 48').

3. A brake system as defined by claim 1, in which a pressure limiting valve (54, 54') is connected parallel to the electromagnetic reversing valve (48, 48'), and opening pressure of the pressure limiting valve being above a maximum starting pressure generated by the at least one pump element (36, 37) of the return pump (35) in traction control.

4. A brake system as defined by claim 2, in which a pressure limiting valve (54, 54') is connected parallel to the electromagnetic reversing valve (48, 48'), an opening pressure of the pressure limiting valve being above a maximum starting pressure generated by the at least one pump element (36, 37) of the return pump (35) in traction control.

5. A brake system as defined by claim 1, in which the reversing valve (48, 48') is embodied as a 2/2-way magnet valve.

6. A brake system as defined by claim 2, in which the reversing valve (48, 48') is embodied as a 2/2-way magnet valve.

7. A brake system as defined by claim 3, in which the reversing valve (48, 48') is embodied as a 2/2-way magnet valve.

8. A brake system as defined by claim 5, in which the charging valve (47, 47') and the electromagnetic reversing valve (48, 48') are embodied such that in a respective unexcited basic position, the charging valve (47, 47') assumes a blocking position and the electromagnetic reversing valve (48, 48') assumes a open position.

9. A brake system as defined by claim 6, in which the charging valve (47, 47') and the electromagnetic reversing valve (48, 48') are embodied such that in a respective unexcited basic position, the charging valve (47, 47') assumes a blocking position and the electromagnetic reversing valve (48, 48') assumes an open position.

10. A brake system as defined by claim 7, in which the charging valve (47, 47') and the electromagnetic reversing valve (48, 48') are embodied such that in a respective unexcited basic position, the charging valve (47, 47') assumes a blocking position and the electromagnetic reversing valve (48, 48') assumes an open position.

11. A brake system as defined by claim 1, in which a check valve (39) having a flow direction toward the pump element (36, 37) is incorporated into a second connection between the inlet of the pump element (36, 37) of the return pump (35) and the control valve (31-34).

12. A brake system as defined by claim 2, in which a check valve (39) having a flow direction toward the pump element (36, 37) is incorporated into a second connection line between the inlet of the pump element (36, 37) of the return pump (35) and the control valve (31-34).

13. A brake system as defined by claim 3, in which a check valve (39) having a flow direction toward the pump element (36, 37) is incorporated into a second connection line between the inlet of the pump element (36, 37) of the return pump (35) and the control valve (31-34).

14. A brake system as defined by claim 5, in which a check valve (39) having a flow direction toward the pump element (36, 37) is incorporated into a second connection line between the inlet of the pump element (36, 37) of the return pump (35) and the control valve (31-34).

15. A brake system as defined by claim 8, in which a check valve (39) having a flow direction toward the pump element (36, 37) is incorporated into a second connection line between the inlet of the pump element (36, 37) of the return pump (35) and the control valve (31-34).

16. A brake system as defined by claim 1, which includes a dual-circuit brake system with first and second separate brake circuits including first and second drive wheels respectively, in which the wheel brake cylinders (10) of the first and second drive wheels (11, 12) are disposed in said first and second brake circuits, and the hydraulic unit (20) is connected to first and second separate brake circuit outlets (16, 17) of the master brake cylinder (15) and said hydraulic unit (20) is connected to outlet channels (21-24) corresponding to the number of vehicle wheels (11-14), first and second control valves (31-32) are assigned to respective outlet channels (21-22), third and fourth control valves (33-34) are assigned to respective outlet channels (23, 24) and first and second pump elements (36, 37), are each operative in said first and second brake circuits, respectively, of the return pump (35), and that for each of said first and second brake circuits, one valve assembly (46, 46') is provided for furnishing a brake supply pressure in traction control.

17. A brake system as defined by claim 2, which includes a dual-circuit brake system with first and second separate brake circuits including first and second drive wheels respectively, in which the wheel brake cylinders (10) of the first and second drive wheels (11, 12) are disposed in said first and second brake circuits, and the hydraulic unit (20) is connected to first and second separate brake circuit outlets (16, 17) of the master brake cylinder (15) and said hydraulic unit (20) is connected to outlet channels (21-24) corresponding to the number of vehicle wheels (11-14), first and second control valves (31-32) are assigned to respective outlet channels (21-22), third and fourth control valves (33-34) are assigned to respective outlet channels (23, 24) and first and second pump elements (36, 37), are each operative in said first and second brake circuits, respectively, of the return pump (35), and that for each of said first and second brake circuits, one valve assembly is provided for furnishing a brake supply pressure in traction control.

18. A brake system as defined by claim 3, which includes a dual-circuit brake system with first and second separate brake circuits including first and second drive wheels respectively, in which the wheel brake cylinders (10) of the first and second drive wheels (11, 12) are disposed in said first and second brake circuits, and the hydraulic unit (20) is connected to first and second separate brake circuit outlets (16, 17) of the master brake cylinder (15) and said hydraulic unit (20) is connected to outlet channels (21-24) corresponding to the number of vehicle wheels (11-14), first and second control valves (31-32) are assigned to respective outlet channels (21-22), third and fourth control valves (33-34) are assigned to respective outlet channels (23, 24) and first and second pump elements (36, 37), are each operative in said first and second brake circuits, respectively, of the return pump (35), and that for each of said first and second brake circuits, one valve assembly (46, 46') is provided for furnishing a brake supply pressure in traction control.

19. A brake system as defined by claim 5, which includes a dual-circuit brake system with first and second separate brake circuits including first and second drive wheels respectively, in which the wheel brake cylinders (10) of the first and second drive wheels (11, 12) are disposed in said first and second brake circuits, and the hydraulic unit (20) is connected to first and second separate brake circuit outlets (16, 17) of the master brake cylinder (15) and said hydraulic unit (20) is connected to outlet channels (21-24) corresponding to the number of vehicle wheels (11-14), first and second control valves (31-32) are assigned to respective outlet channels (21-22), third and fourth control valves (33-34) are assigned to respective outlet channels (23, 24) and first and second pump elements (36, 37), are each operative in said first and second brake circuits, respectively, of the return pump (35), and that for each of said first and second brake circuits, one valve assembly (46, 46') is provided for furnishing a brake supply pressure in traction control.

20. A brake system as defined by claim 8, which includes a dual-circuit brake system with first and second separate brake circuits including first and second drive wheels respectively, in which the wheel brake cylinders (10) of the first and second drive wheels (11, 12) are disposed in said first and second brake circuits, and the hydraulic unit (20) is connected to first and second separate brake circuit outlets (16, 17) of the master brake cylinder (15) and said hydraulic unit (20) is connected to outlet channels (21-24) corresponding to the number of vehicle wheels (11-14), first and second control valves (31-32) are assigned to respective outlet channels, third and fourth control valves (33-34) are assigned to respective outlet channels (23, 24) and first and second pump elements (36, 37), are each operative in said first and second brake circuits, respectively, of the return pump (35), and that for each of said first and second brake circuits, one valve assembly (46, 46') is provided for furnishing a brake supply pressure in traction control.

21. A brake system as defined by claim 11, which includes a dual-circuit brake system with first and second separate brake circuits including first and second drive wheels respectively, in which the wheel brake cylinders (10) of the first and second drive wheels (11, 12) are disposed in said first and second brake circuits, and the hydraulic unit (20) is connected to first and second separate brake circuit outlets (16, 17) of the master brake cylinder (15) and said hydraulic unit (20) is connected to outlet channels (21-24) corresponding to the number of vehicle wheels (11-14), first and second control valves (31-32) are assigned to respective outlet channels (21-22), third and fourth control valves (33-34) are assigned to respective outlet channels (23, 24) and first and second pump elements (36, 37), are each operative in said first and second brake circuits, respectively, of the return pump (35), and that for each of said first and second brake circuits, one valve assembly (46, 46') is provided for furnishing a brake supply pressure in traction control.

22. A brake system as defined by claim 1, in which the control valve (31-34) has on inlet valve (43) and one outlet valve (44), wherein the inlet valve (43) is disposed in a third connecting line (29a, 29b, 30a, 30b; 29, 30) from the master brake cylinder (15) to the outlet channel (21-24), and the outlet valve (44) is disposed in a connection between the outlet channel (21-24) and the inlet of the pump element (36, 37).

23. A brake system as defined by claim 2, in which the control valve (31-34) has one inlet valve (43) and one outlet valve (44), wherein the inlet valve (43) is disposed in a third connecting line (29a, 29b, 30a, 30b; 29, 30) from the master brake cylinder (15) to the outlet channel (21-24), and the outlet valve (44) is disposed in a connection between the outlet channel (21-24) and the inlet of the pump element (36, 37).

24. A brake system as defined by claim 3, in which the control valve (31-34) has one inlet valve (43) and one outlet valve (44), wherein the inlet valve (43) is disposed in a third connecting line (29a, 29b, 30a, 30b; 29, 30) from the master brake cylinder (15) to the outlet channel (21-24), and the outlet valve (44) is disposed in a connection between the outlet channel (21-24) and the inlet of the pump element (36, 37).

25. A brake system as defined by claim 5, in which the control valve (31-34) has one inlet valve (43) and one outlet valve (44), wherein the inlet valve (43) is disposed in a third connecting line (29a, 29b, 30a, 30b; 29, 30) from the master brake cylinder (15) to the outlet channel (21-24), and the outlet valve (44) is disposed in a connection between the outlet channel (21-24) and the inlet of the pump element (36, 37).

26. A brake system as defined by claim 8, in which the control valve (31-34) has one inlet valve (43) and one outlet valve (44), wherein the inlet valve (43) is disposed in a third connecting line (29a, 29b, 30a, 30b; 29, 30) from the master brake cylinder (15) to the outlet channel (21-24), and the outlet valve (44) is disposed in a connection between the outlet channel (21-24) and the inlet of the pump element (36, 37).

27. A brake system as defined by claim 11, in which the control valve (31-34) has one inlet valve (43) and one outlet valve (44), wherein the inlet valve (43) is disposed in a third connecting line (29a, 29b, 30a, 30b; 29, 30) from the master brake cylinder (15) to the outlet channel (21-24), and the outlet valve (44) is disposed in a connection between the outlet channel (21-24) and the inlet of the pump element (36, 37).

28. A brake system as defined by claim 16, in which the control valve (31-34) has one inlet valve (43) and one outlet valve (44), wherein the inlet valve (43) is disposed in a third connecting line (29a, 29b, 30a, 30b; 29, 30) from the master brake cylinder (15) to the outlet channel (21-24), and the outlet valve (44) is disposed in a connection between the outlet channel (21-24) and the inlet of the pump element (36, 37).

* * * * *